United States Patent
Asaba

(10) Patent No.: US 11,239,467 B2
(45) Date of Patent: Feb. 1, 2022

(54) COMPOSITION FOR SECONDARY BATTERY ELECTRODE

(71) Applicant: SEKISUI CHEMICAL CO., LTD., Osaka (JP)

(72) Inventor: Yuutarou Asaba, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 92 days.

(21) Appl. No.: 16/647,905

(22) PCT Filed: Sep. 27, 2018

(86) PCT No.: PCT/JP2018/036017
§ 371 (c)(1),
(2) Date: Mar. 17, 2020

(87) PCT Pub. No.: WO2019/065869
PCT Pub. Date: Apr. 4, 2019

(65) Prior Publication Data
US 2020/0220175 A1 Jul. 9, 2020

(30) Foreign Application Priority Data

Sep. 28, 2017 (JP) .............................. JP2017-188697

(51) Int. Cl.
*H01M 4/62* (2006.01)
*C08F 116/38* (2006.01)
*H01M 4/36* (2006.01)
*H01M 10/0525* (2010.01)

(52) U.S. Cl.
CPC ........... *H01M 4/622* (2013.01); *C08F 116/38* (2013.01); *H01M 4/362* (2013.01); *H01M 10/0525* (2013.01)

(58) Field of Classification Search
CPC .. H01M 4/622; H01M 4/362; H01M 10/0525; H01M 4/131; H01M 4/1391; C08F 116/38; C08F 216/06; C08F 216/38; Y02E 60/10

See application file for complete search history.

(56) References Cited

U.S. PATENT DOCUMENTS

2018/0201709 A1    7/2018  Morita et al.

FOREIGN PATENT DOCUMENTS

| | | |
|---|---|---|
| JP | 2012-195289 | 10/2012 |
| JP | 2013-65509 | 4/2013 |
| JP | 2013-179040 | 9/2013 |
| JP | 5708872 | 4/2015 |
| JP | 2015-141883 | 8/2015 |
| JP | 2015-196755 | 11/2015 |
| JP | 2015196755 A * | 11/2015 |
| JP | 2016-76374 | 5/2016 |
| JP | 2016-76485 | 5/2016 |
| JP | 2016076374 A * | 5/2016 |
| JP | 2018-31015 | 3/2018 |
| JP | 2018-60774 | 4/2018 |
| WO | 2017/047662 | 3/2017 |

OTHER PUBLICATIONS

English Translation of JP2016076374 (Year: 2016).*
English Translation of JP2015196755 (Year: 2015).*
International Search Report dated Dec. 18, 2018 in International (PCT) Application No. PCT/JP2018/036017.

* cited by examiner

*Primary Examiner* — Andrew J. Oyer
(74) *Attorney, Agent, or Firm* — Wenderoth, Lind & Ponack, L.L.P.

(57) ABSTRACT

The present invention aims to provide a composition for a secondary battery electrode which is excellent in dispersibility of an active material and adhesiveness, capable of preventing battery deterioration and failure due to moisture absorption, and capable of providing a high-capacity secondary battery. Provided is a composition for a secondary battery electrode, containing: an active material; a binder; and an organic solvent, the binder containing a polyvinyl acetal resin, the polyvinyl acetal resin having an electron-donating group that has an acid dissociation constant in water of less than 16 and an electron-withdrawing group, the polyvinyl acetal resin having a degree of polymerization of 250 to 800 and a hydroxy group content of 35 to 70 mol %.

15 Claims, No Drawings

COMPOSITION FOR SECONDARY BATTERY ELECTRODE

TECHNICAL FIELD

The present invention relates to a composition for a secondary battery electrode which is excellent in dispersibility of an active material and adhesiveness, capable of preventing battery deterioration and failure due to moisture absorption, and capable of providing a high-capacity secondary battery.

BACKGROUND ART

With the recent spread of mobile electronic devices such as mobile video cameras and mobile PCs, demand for secondary batteries as a portable power source is rapidly increasing. In addition, with respect to such secondary batteries, there is a great need for achieving downsizing, weight reduction, and enhanced energy density.

Conventionally, aqueous batteries such as lead batteries and nickel-cadmium batteries have been mainly used as secondary batteries which can be repeatedly charged and discharged. Though these aqueous batteries have excellent charge/discharge characteristics, they do not sufficiently satisfy the properties as a portable power source for a mobile electronic device in terms of the battery weight and energy density.

Lithium secondary batteries including a negative electrode made of lithium or a lithium alloy have been thus intensively studied and developed as secondary batteries. The lithium secondary batteries have excellent properties such as high energy density, less self-discharge, and light weight.

An electrode of a lithium secondary battery is commonly prepared as follows. An active material and a binder are kneaded together with a solvent so that the active material is dispersed, thereby preparing a slurry. The slurry is applied to a current collector by the doctor blade method or the like, and dried to form a thin film as an electrode.

At the present, a fluororesin typified by polyvinylidene fluoride (PVDF) is most widely used as a binder for an electrode of a lithium secondary battery.

In the case of using a fluororesin as a binder, though a flexible thin film can be prepared, binding between a current collector and an active material is poor. Due to this, the active material may partially or entirely be detached or fall off during a process of producing a battery. Moreover, upon charge and discharge of the battery, insertion and release of lithium ions are repeated in the active material. Due to this phenomenon, the active material may be detached or fall off from the current collector.

To solve such a problem, a binder other than PVDF has been tried to be used. In the case of using a conventional resin, however, decomposition or deterioration of the resin may occur upon application of a voltage to an electrode. When the resin is decomposed or deteriorated, the charge/discharge capacity may be lowered and the electrode may be detached.

To overcome such a situation, Patent Literature 1 discloses a binder for a non-aqueous secondary battery which includes a copolymer prepared from an acidic functional group-containing monomer and an amide group-containing monomer.

In the case of using such a binder, however, the dispersibility of an active material is lowered and the viscosity of the resulting composition for an electrode increases. In such a case, paste filtration takes time to prolong the preparation time and coating unevenness is likely to be developed upon application of the composition. In addition, since the active material density in the electrode is lowered, the capacity of the resulting battery is insufficient.

Moreover, the use of such a resin lowers the flexibility of the resulting electrode to cause cracking or peeling thereof from the current collector, leading to poor battery durability.

Patent Literature 2 discloses a composition of a binder for a secondary battery positive electrode containing an aromatic vinyl unit, a nitrile group unit, a hydrophilic group unit, and a linear alkylene unit each in a predetermined amount.

Even in the case of using such a composition, the dispersibility of the active material is lowered, so that paste filtration takes time to prolong the preparation time. In addition, coating unevenness is likely to be developed upon application of the composition. Moreover, when a composition for an electrode is prepared with high moisture content, moisture may cause acidic gas generation from the inside of the battery, inducing expansion, ignition, or explosion of the battery.

In addition, since the active material density in the electrode is lowered, the capacity of the resulting battery is insufficient.

CITATION LIST

Patent Literature

Patent Literature 1: JP 5708872 B
Patent Literature 2: JP 2013-179040 A

SUMMARY OF INVENTION

Technical Problem

The present invention aims to provide a composition for a secondary battery electrode which is excellent in dispersibility of an active material and adhesiveness, capable of preventing battery deterioration and failure due to moisture absorption, and capable of providing a high-capacity secondary battery.

Solution to Problem

The present invention relates to a composition for a secondary battery electrode, containing: an active material; a binder; and an organic solvent, the binder containing a polyvinyl acetal resin, the polyvinyl acetal resin having an electron-donating group that has an acid dissociation constant in water of less than 16 and an electron-withdrawing group, the polyvinyl acetal resin having a degree of polymerization of 250 to 800 and a hydroxy group content of 35 to 70 mol %.

The present invention is described in detail below.

The present inventor made intensive studies to find out that the use of a polyvinyl acetal resin having a predetermined electron-donating group and a predetermined electron-withdrawing group as a binder for secondary battery electrode formation leads to excellent dispersibility of an active material and excellent adhesiveness. The inventor also found out that the use of such a binder can prevent battery deterioration and failure due to moisture absorption, and enables production of a high-capacity secondary battery even when the amount of the binder added is small. The inventor thus completed the present invention.

The composition for a secondary battery electrode of the present invention contains an active material.

The composition for a secondary battery electrode of the present invention may be used for a positive electrode or a negative electrode, or it may be used for both a positive electrode and a negative electrode. Accordingly, examples of a usable active material include positive electrode active materials and negative electrode active materials.

Examples of the positive electrode active materials include lithium-containing composite metal oxides such as lithium nickel oxides, lithium cobalt oxides, lithium manganese oxides, Ni—Co—Mn ternary Li-containing oxides, and Ni—Co—Al ternary Li-containing oxides. Specific examples thereof include $LiNiO_2$, $LiCoO_2$, $LiMn_2O_4$, and lithium iron phosphate.

These may be used alone or in combination of two or more thereof.

The negative electrode active material used may be a negative electrode active material conventionally used for a secondary battery, and examples thereof include spherical natural graphite, natural graphite, artificial graphite, amorphous carbon, carbon black, and those obtained by adding a foreign element to these.

The composition for a secondary battery electrode of the present invention preferably contains a conductivity imparting agent (conductive aid).

Examples of the conductivity imparting agent include graphite, acetylene black, carbon black, Ketjenblack, and vapor-grown carbon fiber. In particular, the conductivity imparting agent used for a positive electrode is preferably acetylene black or carbon black, while the conductivity imparting agent used for a negative electrode is preferably acetylene black or scaly graphite.

The composition for a secondary battery electrode of the present invention contains a polyvinyl acetal resin. In the present invention, the use of a polyvinyl acetal resin as a binder (a binding agent) causes an attractive interaction between a hydroxyl group of the polyvinyl acetal resin and an oxygen atom of the positive electrode active material, leading to a structure in which the polyvinyl acetal resin surround the positive electrode active material. In addition, another hydroxyl group in the same molecule has an attractive interaction with the conductivity imparting agent to keep the distance between the active material and the conductivity imparting agent within a predetermined range. Such a characteristic structure in which the distance between the active material and the conductivity imparting agent is kept within a specific range remarkably improves the dispersibility of the active material. In comparison with the case where a resin such as PVDF is used, the adhesion to the current collector can be improved. Moreover, the solvent solubility is excellent to advantageously widen the range of solvent selection.

The polyvinyl acetal resin has an electron-donating group that has an acid dissociation constant in water of less than 16.

In the present invention, the use of the electron-donating group in combination with the electron-withdrawing group described later can increase the electron conductivity and reduce the electrical resistance.

In the present invention, the "electron-donating group" is a functional group having a Hammett substituent constant for the para effect σp of less than 0. The "electron-withdrawing group" is a functional group having a Hammett substituent constant for the para effect σp of 0 or more.

The electron-donating group and the electron-withdrawing group do not include a hydroxy group and an acetyl group.

The electron-donating group has an acid dissociation constant (pKa) in water of less than 16.

The electron-donating group with the pKa less than 16 can easily release electrons. The pKa is preferably less than 12. The pKa is preferably 0.1 or more.

The pKa of the electron-donating group can be measured by potentiometry or neutralization titration.

The binding site of the electron-donating group is not limited. Exemplary structures include a structure in which the electron-donating group is bonded directly or via an linking group to carbon constituting a main chain, a structure in which the electron-donating group is bonded to an acetal group, a structure in which a graft chain having the electron-donating group is bonded, and a structure in which the electron-donating group is bonded to a terminal of the resin.

Preferred are a structure in which the electron-donating group is directly bonded to carbon constituting a main chain and a structure in which the electron-donating group is bonded via a linking group to carbon constituting a main chain.

Examples of the electron-donating group include a lower alkoxy group, an ether group, an amino group, an alkylamino group, —S—, and a functional group having a lactam structure. In the present invention, the lower alkoxy group is a C1-C6 linear or branched alkoxy group.

The electron-donating group is preferably a functional group having a lactam structure.

The polyvinyl acetal resin having the electron-donating group is advantageous in that it has excellent resistance against an electrolyte solution, excellent adhesiveness to a current collector, and excellent ion conductivity and enables production of a high-capacity secondary battery even when the amount of the binder added is reduced.

The polyvinyl acetal resin having the electron-donating group is advantageous also in that it can prevent deterioration due to moisture absorption during long term storage, providing excellent storability.

In the present invention, the lactam structure means a structure having a lactam group.

The lactam group means a group obtained by removing a hydrogen atom, an alkyl group, and/or the like bonded to a nitrogen atom of a lactam compound.

Examples of the lactam compound include caprolactam, N-alkylcaprolactams, pyrrolidones, and piperidones.

Examples of the N-alkylcaprolactam include N-methylcaprolactam, N-ethylcaprolactam, N-isopropylcaprolactam, N-isobutylcaprolactam, N-normalpropylcaprolactam, N-normalbutylcaprolactam, and N-cyclohexylcaprolactam.

Examples of the pyrrolidone include 2-pyrrolidone, N-methyl-2-pyrrolidone (NMP), N-ethyl-2-pyrrolidone, N-isopropyl-2-pyrrolidone, N-isobutyl-2-pyrrolidone, N-normalpropyl-2-pyrrolidone, N-normalbutyl-2-pyrrolidone, and N-cyclohexyl-2-pyrrolidone.

Examples of the piperidone include 2-piperidone, N-methyl-2-piperidone, N-ethyl-2-piperidone, and N-isopropyl-2-piperidone.

The lactam group may be substituted with, for example, a substituent such as a halogen atom, a hydroxy group, a carboxy group, an amide group, an alkyl group, an alkyl ester group, an alkylamide group, or a nitro group, or a salt thereof.

The lactam structure is preferably a structure represented by the following formula (1).

[Chem. 1]

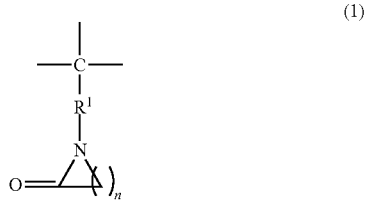

In the formula (1), n is an integer of 1 to 5 and $R^1$ is a single bond or a C1-C10 saturated or unsaturated hydrocarbon.

When the lactam structure represented by the above formula (1) has a structure in which the lactam group is bonded to the main chain via a saturated or unsaturated hydrocarbon, the lactam group is less likely to be affected by the main chain because the saturated or unsaturated hydrocarbon exists between the lactam group and the main chain. $R^1$ is preferably a single bond.

$R^1$ is a single bond or a C1-C10 saturated or unsaturated hydrocarbon. $R^1$ may be, for example, a linear or branched alkylene group or an arylene group.

The alkylene group is preferably a linear alkylene group, preferably a C1-C6 alkylene group. In particular, a methylene group, an ethylene group, a propylene group, and the like are preferred.

The lactam structure is preferably a 3- to 7-membered ring, more preferably has at least one cyclic structure selected from the group consisting of a 3-membered ring, a 4-membered ring, a 5-membered ring, and a 6-membered ring. With such a lactam structure, the steric hindrance of the cyclic structure inhibits the re-aggregation of an active material or a conductive aid, enabling production of a paste that shows less viscosity change with time. Preferably, n is an integer of 1 to 5, more preferably 1 or 2.

Preferably, a hydrocarbon constituting the cyclic structure of the lactam structure is unsubstituted, or a hydrogen atom of the hydrocarbon is substituted with a C1-C10 saturated or unsaturated hydrocarbon.

When a hydrogen atom of the hydrocarbon constituting the cyclic structure of the lactam structure is substituted, α-hydrogen or β-hydrogen is preferably substituted.

The C1-C10 saturated or unsaturated hydrocarbon is preferably a methyl group, an ethyl group, an isopropyl group, a dimethyl group, an allyl group, or a phenyl group. Hydrogen atom(s) in one or two or more positions may be substituted.

In the polyvinyl acetal resin, the lower limit of the amount of a structural unit having the electron-donating group is preferably 0.01 mol % and the upper limit thereof is preferably 10 mol %. When the amount is 0.01 mol % or more, the adhesiveness can be improved. When the amount is 10 mol % or less, an increase in viscosity can be prevented. The lower limit of the amount is more preferably 0.05 mol % and the upper limit thereof is more preferably 8 mol %. The upper limit is still more preferably 6 mol %.

The polyvinyl acetal resin has an electron-withdrawing group.

The electron-withdrawing group preferably has an acid dissociation constant (pKa) in water of less than 25.

The electron-withdrawing group with the pKa less than 25 can efficiently accept electrons. The pKa is more preferably less than 20. The pKa is preferably 1.0 or more.

The pKa of the electron-withdrawing group can be measured by potentiometry or neutralization titration.

The binding site of the electron-withdrawing group is not limited. Exemplary structures include a structure in which the electron-withdrawing group is bonded directly or via an linking group to carbon constituting a main chain, a structure in which the electron-withdrawing group is bonded to an acetal group, a structure in which a graft chain having the electron-withdrawing group is bonded, and a structure in which the electron-withdrawing group is bonded to a terminal of the resin. Preferred are a structure in which the electron-withdrawing group is directly bonded to carbon constituting a main chain and a structure in which the electron-withdrawing group is bonded via a linking group to carbon constituting a main chain.

Examples of the electron-withdrawing group include acidic groups such as a carboxy group, a phosphoric acid group, a boronic acid, and boronate, nitrogen-containing groups such as a nitro group ($-NO_2$), an amide group, and a nitrile group, sulfur-containing groups such as a sulfo group, a sulfonyl group, and a sulfinyl group, and other groups such as a formyl group ($-CHO$), fluorinated alkyl groups, and halogens.

Preferred among them is a carboxy group.

In the polyvinyl acetal resin, the lower limit of the amount of a structural unit having the electron-withdrawing group is preferably 0.01 mol % and the upper limit thereof is preferably 10 mol %. When the amount is 0.01 mol % or more, the dispersibility of an active material and a conductive aid can be improved. When the amount is 10 mol % or less, an increase in viscosity can be prevented. The lower limit of the amount is more preferably 0.05 mol % and the upper limit thereof is more preferably 8 mol %. The upper limit is still more preferably 6 mol %.

In the polyvinyl acetal resin, the ratio of the amount of the structural unit having the electron-withdrawing group to the amount of the structural unit having the electron-donating group (the amount of the structural unit having the electron-withdrawing group/the amount of the structural unit having the electron-donating group) is preferably 0.001 to 1,000. When the ratio is within the range, the electron conductivity can be enhanced and the electrical resistance can be reduced. The ratio is preferably 0.01 to 100.

In the polyvinyl acetal resin, the difference between the acid dissociation constant of the electron-donating group and the acid dissociation constant of the electron-withdrawing group (the acid dissociation constant of the electron-withdrawing group—the acid dissociation constant of the electron-donating group) is preferably 1.0 to 20. When the difference is within the range, the electron conductivity can be enhanced and the electrical resistance can be reduced. The difference is preferably 1.5 to 15.0.

In the polyvinyl acetal resin, the ratio of the amount of the structural unit having the electron-withdrawing group to the hydroxy group content (the amount of the structural unit having the electron-donating group/hydroxy group content) is preferably $1.00 \times 10^{-4}$ to $4.5 \times 10^{-1}$. When the ratio is within the range, the electrons can be efficiently transferred, increasing the electrical conductivity.

The polyvinyl acetal resin has a structural unit having an acetal group.

The amount of the structural unit having an acetal group (degree of acetalization) in the polyvinyl acetal resin is preferably 20 to 70 mol %. With the degree of acetalization of 20 mol % or higher, the solubility of the resin in a solvent is improved, and the resin is favorably used as a component of a composition. When the degree of acetalization is 70 mol % or lower, the resistance against an electrolyte solution is enough to prevent dissolution of resin components in the electrolyte solution when the resulting electrode is immersed in the electrolyte solution. The degree of acetalization is more preferably 40 to 65 mol %, still more preferably 45 to 65 mol %.

The degree of acetalization as used herein refers to the proportion of the number of hydroxyl groups acetalized with aldehyde to the number of hydroxyl groups in the polyvinyl alcohol. Since an acetal group of the polyvinyl acetal resin is formed by acetalization of two hydroxyl groups, the degree of acetalization (mol %) can be calculated by counting the unit of acetalized two hydroxyl groups.

The degree of acetalization as used herein means the amount of a structural unit having an acetal group in the entire polyvinyl acetal resin.

The structural unit having an acetal group can be obtained by acetalization with an aldehyde.

The lower limit of the carbon number of the aldehyde (the number of carbons excluding the aldehyde group) is preferably 1, and the upper limit thereof is preferably 11. With the carbon number within the above range, the resin has lower hydrophobicity to have better purification efficiency, leading to reduction of the Na ion content.

Specific examples of the aldehyde include acetaldehyde, butyraldehyde, benzaldehyde, propionaldehyde, and aldehydes having a vinyl group (vinyl aldehydes) such as acrolein.

The acetal group is preferably at least one selected from the group consisting of a butyral group, a benzacetal group, an acetoacetal group, a propionacetal group, and a vinyl acetal group.

In the polyvinyl acetal resin, the ratio of a portion acetalized with acetaldehyde to a portion acetalized with butyraldehyde is preferably 0/100 to 50/50. With this structure, the polyvinyl acetal resin is soft to have favorable adhesion to a current collector. The ratio of the portion acetalized with acetaldehyde to the portion acetalized with butyraldehyde is more preferably 0/100 to 20/80.

The polyvinyl acetal resin has a structural unit having a hydroxy group.

In the polyvinyl acetal resin, the lower limit of the amount of the structural unit having a hydroxy group (hydroxy group content) is 35 mol % and the upper limit thereof is 70 mol %. When the hydroxy group content is 35 mol % or more, the resistance against an electrolyte solution can be improved, so that the dissolution of the resin in the electrolyte solution can be prevented. When the hydroxy group content is 70 mol % or less, the flexibility of the resin is improved and sufficient adhesion to a current collector is obtained.

The lower limit of the hydroxy group content is preferably 40 mol % and the upper limit thereof is preferably 65 mol %. The lower limit is more preferably 45 mol % and the upper limit is more preferably 60 mol %.

The hydroxy group content as used herein means the amount of the structural unit having a hydroxy group in the entire polyvinyl acetal resin.

The polyvinyl acetal resin preferably has a structural unit having an acetyl group.

In the polyvinyl acetal resin, the lower limit of the amount of the structural unit having an acetyl group (acetyl group content) is preferably 0.1 mol %, and the upper limit thereof is preferably 15 mol %. When the acetyl group content is 0.1 mol % or more, the resin has better flexibility to ensure sufficient adhesion to a current collector. When the acetyl group content is 15 mol % or less, the resistance against an electrolyte solution is improved to prevent short circuit caused by dissolution of the resin in the electrolyte solution. The lower limit of the acetyl group content is more preferably 1 mol % and the upper limit thereof is more preferably 10 mol %.

The acetyl group content as used herein means the amount of the structural unit having an acetyl group in the entire polyvinyl acetal resin.

In the polyvinyl acetal resin, the ratio of the amount of the structural unit having the electron-donating group to the amount of the structural unit having a hydroxy group (the amount of structural unit having the electron-donating group/the amount of structural unit having a hydroxy group) is preferably 0.0001 to 1.50. When the ratio is within the range, the electrical resistance of the composition for a secondary battery electrode can be reduced.

The ratio is more preferably 0.01 to 0.89, still more preferably 0.01 to 0.43.

The lower limit of the degree of polymerization of the polyvinyl acetal resin is 250 and the upper limit thereof is 800. A polyvinyl acetal resin with the degree of polymerization of 250 or higher is industrially easy to obtain. When the degree of polymerization of the polyvinyl acetal resin is 800 or lower, the solution viscosity is lowered so that the active material can be sufficiently dispersed. The lower limit of the degree of polymerization is preferably 280 and the upper limit thereof is preferably 600.

In the present invention, "a polyvinyl acetal resin has an electron-donating group and an electron-withdrawing group" includes cases where the electron-donating group and the electron-withdrawing group are present in the same polyvinyl acetal resin, as well as cases where the electron-donating group and the electron-withdrawing group are present in different polyvinyl acetal resins. In the case where the electron-donating group and the electron-withdrawing group are present in different polyvinyl acetal resins, the "degree of polymerization of a polyvinyl acetal resin" means a degree of polymerization calculated by distributing the degrees of polymerization of the resins proportionally according to the mixing ratio.

The amount of the polyvinyl acetal resin in the composition for a secondary battery electrode of the present invention is not particularly limited. The lower limit thereof is preferably 0.2% by weight and the upper limit thereof is preferably 5% by weight. When the amount of the polyvinyl acetal resin is 0.2% by weight or more, the adhesion to a current collector is improved. When the amount of the polyvinyl acetal resin is 5% by weight or less, the discharge capacity of the secondary battery can be improved. The amount of the polyvinyl acetal resin is more preferably 0.5 to 3% by weight.

The polyvinyl acetal resin is prepared by acetalizing a polyvinyl alcohol with an aldehyde.

In particular, an exemplary method of producing the polyvinyl acetal resin includes preparing a polyvinyl alcohol having the electron-donating group and the electron-withdrawing group and acetalizing the polyvinyl alcohol. Another exemplary method includes acetalizing a polyvinyl alcohol free of the electron-donating group and the electron-withdrawing group and adding the electron-donating group and the electron-withdrawing group.

Yet another exemplary method includes preparing a polyvinyl alcohol mixture containing a polyvinyl alcohol having the electron-donating group and a polyvinyl alcohol having the electron-withdrawing group and acetalizing the polyvinyl alcohol mixture.

An exemplary method of producing the polyvinyl alcohol having the electron-donating group and the electron-withdrawing group includes copolymerizing a monomer containing the electron-donating group, a monomer containing the electron-withdrawing group, and a vinyl ester such as vinyl acetate, followed by adding an acid or alkali to a solution of the obtained copolymer in alcohol for saponification.

Examples of the monomer containing the electron-donating group include lactam group-containing monomers.

Examples of the lactam group-containing monomer include N-vinyl-pyrrolidone, N-vinyl-2-piperidone, N-vinyl-2-caprolactam, N-vinyl-3-methyl-2-pyrrolidone, and N-vinyl-3-methyl-2-piperidone. Examples also include N-vinyl-3-methyl-2-caprolactam, N-vinyl-4-methyl-2-pyrrolidone, N-vinyl-4-methyl-2-piperidone, N-vinyl-4-methyl-2-caprolactam, and N-vinyl-5-methyl-2-pyrrolidone. Examples also include N-vinyl-5-methyl-2-piperidone, N-vinyl-5-methyl-2-caprolactam, N-vinyl-3-ethyl-2-pyrrolidone, N-vinyl-4,5-dimethyl-2-pyrrolidone, and N-vinyl-3,3,5-trimethyl-2-pyrrolidone.

An exemplary method of adding the electron-donating group and the electron-withdrawing group includes reacting a polyvinyl acetal resin free of the electron-donating group and the electron-withdrawing group with a monomer containing the electron-donating group, a monomer containing the electron-withdrawing group, and the like.

The polyvinyl alcohol free of the electron-donating group and the electron-withdrawing group is obtained, for example, by saponifying a copolymer of a vinyl ester and ethylene. Examples of the vinyl ester include vinyl formate, vinyl acetate, vinyl propionate, and vinyl pivalate. From the standpoint of the economic efficiency, preferred is vinyl acetate.

The composition for a secondary battery electrode of the present invention may further contain, in addition to the polyvinyl acetal resin, a polyvinylidene fluoride resin.

The use of the polyvinylidene fluoride resin in combination further improves the resistance against an electrolyte solution to improve the discharge capacity.

In the case where the polyvinylidene fluoride resin is contained in the composition, the weight ratio between the polyvinyl acetal resin and the polyvinylidene fluoride resin is preferably 0.5:9.5 to 7:3.

When the weight ratio is within such a range, the resistance against an electrolyte solution can be imparted, while the adhesion to a current collector which polyvinylidene fluoride remarkably lacks is maintained.

The weight ratio between the polyvinyl acetal resin and the polyvinylidene fluoride resin is more preferably 1:9 to 4:6.

The lower limit of the amount of the polyvinyl acetal resin in the composition for a secondary battery electrode of the present invention is preferably 0.01 parts by weight and the upper limit thereof is preferably 20 parts by weight relative to 100 parts by weight of the active material. When the amount of the polyvinyl acetal resin is 0.01 parts by weight or more, the adhesion to a current collector can be improved. When the amount of the polyvinyl acetal resin is 20 parts by weight or less, the discharge capacity of the secondary battery can be improved.

The lower limit of the amount of the polyvinyl acetal resin in the composition for a secondary battery electrode relative to 100 parts by weight of the conductive aid is preferably 0.01 parts by weight and the upper limit thereof is preferably 200 parts by weight.

The entire amount of the binder in the composition for a secondary battery electrode of the present invention is not limited. The lower limit thereof is preferably 1% by weight and the upper limit thereof is preferably 30% by weight. When the amount of the binder is 1% by weight or more, the adhesion to a current collector can be improved. When the amount of the binder is 30% by weight or less, the discharge capacity of the secondary battery can be improved.

The composition for a secondary battery electrode of the present invention contains an organic solvent.

Any organic solvent may be used as long as the polyvinyl acetal resin can be dissolved therein. Examples thereof include cyclohexanone, methyl ethyl ketone, methyl isobutyl ketone, tetrahydrofuran, toluene, isopropyl alcohol, N-methylpyrrolidone, ethanol, and distilled water. Preferred among these is N-methylpyrrolidone.

These organic solvents may be used alone or in combination of two or more thereof.

The amount of the organic solvent in the composition for a secondary battery electrode of the present invention is not limited. The lower limit thereof is preferably 20% by weight and the upper limit thereof is preferably 50% by weight. When the amount of the organic solvent is 20% by weight or more, the viscosity of the paste is lowered to facilitate application of the paste. When the amount of the organic solvent is 50% by weight or less, development of unevenness after drying the solvent can be prevented. The lower limit is more preferably 25% by weight and the upper limit is more preferably 40% by weight.

The composition for a secondary battery electrode of the present invention may optionally contain, in addition to the active material, polyvinyl acetal resin, and organic solvent described above, additives such as a flame retardant auxiliary, a thickener, a defoamer, a leveling agent, and an adhesion imparting agent.

The composition for a secondary battery electrode of the present invention may be produced by any method, and an exemplary method includes mixing the active material, the binder containing a polyvinyl acetal resin, the organic solvent, and optionally added additives with any mixer such as a planetary mixer, a disperser, a ball mill, a blender mill, or a triple roll mill.

The composition for a secondary battery electrode of the present invention is formed into an electrode by application thereof to a conductive substrate, followed by drying.

A secondary battery including the composition for a secondary battery electrode of the present invention is also encompassed by the present invention.

Examples of the secondary battery include NiCd batteries, nickel hydrogen batteries, lithium secondary batteries, all-solid-state batteries, and fuel batteries. Preferred among them are lithium secondary batteries.

Various means may be employed for application of the composition for a secondary battery electrode of the present invention to a conductive substrate, such as an extrusion coater, a dip coater, a spin coater, a reverse roller, a doctor blade, or an applicator.

Advantageous Effects of Invention

The present invention can provide a composition for a secondary battery electrode which is excellent in dispersibility of an active material and adhesiveness, capable of preventing battery deterioration and failure due to moisture absorption, and capable of providing a high-capacity secondary battery. The composition for a secondary battery electrode of the present invention is also excellent in viscosity, capable of preventing decomposition and deterioration when a voltage is applied to the electrode, and capable of providing a highly flexible secondary battery electrode.

DESCRIPTION OF EMBODIMENTS

The present invention is more specifically described in the following with reference to, but not limited to, examples.
(Synthesis of Polyvinyl Acetal Resin A)
To 3,000 parts by weight of pure water was added 350 parts by weight of a polyvinyl alcohol (degree of polymerization: 250, degree of saponification: 98.3 mol %) having a structural unit having an electron-donating group (lactam structure represented by the following formula (2), n=1 in the formula (1)) and a structural unit having an electron-withdrawing group (carboxy group). They were stirred at 90° C. for about two hours to dissolve the polyvinyl alcohol. In the polyvinyl alcohol, the amount of the structural unit having a lactam structure represented by the following formula (2) [electron-donating group content] was 0.01 mol %. The amount of the structural unit having a carboxy group [electron-withdrawing group content] was 10 mol %.

This solution was cooled to 40° C., and 230 parts of hydrochloric acid having a concentration of 35% by weight was added thereto. The solution temperature was then lowered to 5° C. and 53.1 parts by weight of n-butyraldehyde was added. Acetalization reaction was performed while the solution temperature was held at 5° C., whereby a reaction product was precipitated. The solution temperature was then held at 30° C. for three hours to complete the reaction, followed by neutralization, washing with water, and drying by conventional methods, whereby white powder of a polyvinyl acetal resin was obtained.

The obtained polyvinyl acetal resin A was analyzed by FT-IR for hydroxy group content, degree of acetalization, electron-withdrawing group content, and electron-donating group content. The hydroxy group content was 35.2 mol %, the degree of acetalization (degree of butyralization) was 53.1 mol %, the acetyl group content was 1.7 mol %, the electron-donating group content was 0.01 mol %, and the electron-withdrawing group content was 10 mol %.

[Chem. 2]

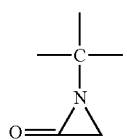

(2)

(Synthesis of Polyvinyl Acetal Resins B to I, L to O, Q to V, and Y1 to Y4)
Polyvinyl acetal resins B to I, L to O, Q to V, and Y1 to Y4 were synthesized in the same manner as the polyvinyl acetal resin A except that the polyvinyl alcohols (types) and aldehydes (amounts) shown in Table 1 were used.
(Synthesis of Polyvinyl Acetal Resin J1)
A polyvinyl acetal resin J1 was synthesized in the same manner as the polyvinyl acetal resin A except that a polyvinyl alcohol J1 (degree of polymerization: 400, degree of saponification: 98.3 mol %) was used instead of the polyvinyl alcohol A, and the aldehyde (amount) shown in Table 1 was used. In the polyvinyl alcohol J1, the amount of a structural unit having an amino group [electron-donating group content] was 0.1 mol %. The amount of a structural unit having a sulfo group [electron-withdrawing group content] was 0.1 mol %.
(Synthesis of Polyvinyl Acetal Resin J2)
A polyvinyl acetal resin J2 was synthesized in the same manner as the polyvinyl acetal resin A except that a polyvinyl alcohol J2 (degree of polymerization: 400, degree of saponification: 98.1 mol %) was used instead of the polyvinyl alcohol A, and the aldehyde (amount) shown in Table 1 was used. In the polyvinyl alcohol J2, the amount of a lactam structure [n=3 in the formula (1), pyrrolidone modification] [electron-donating group content] was 0.1 mol %. The amount of a structural unit having a carboxy group [electron-withdrawing group content] was 0.1 mol %.
(Synthesis of Polyvinyl Acetal Resin J3)
A polyvinyl acetal resin J3 was synthesized in the same manner as the polyvinyl acetal resin A except that a polyvinyl alcohol J3 (degree of polymerization: 800, degree of saponification: 98.4 mol %) was used instead of the polyvinyl alcohol A, and the aldehyde (amount) shown in Table 1 was used. In the polyvinyl alcohol J3, the amount of a structural unit having a lactam structure represented by the above formula (2) [electron-donating group content] was 0.1 mol %. The amount of a structural unit having an amide group [electron-withdrawing group content] was 0.1 mol %.
(Synthesis of Polyvinyl Acetal Resins K and P)
A polyvinyl acetal resin K was synthesized in the same manner as the polyvinyl acetal resin A except that a polyvinyl alcohol mixture K was used instead of the polyvinyl alcohol A and the aldehyde (amount) shown in Table 1 was used. The polyvinyl alcohol mixture K was prepared by mixing, at 1:1, a polyvinyl alcohol having a structural unit having an electron-donating group (lactam structure represented by the above formula (2)) and a polyvinyl alcohol having a structural unit having an electron-withdrawing group (carboxy group).

The polyvinyl alcohol having a structural unit having an electron-donating group (lactam structure represented by the above formula (2)) had a degree of polymerization of 600 and a degree of saponification of 97.8 mol %, and the amount of the structural unit having a lactam structure represented by the above formula (2) [electron-donating group content] in the polyvinyl alcohol was 0.2 mol %.

The polyvinyl alcohol having a structural unit having an electron-withdrawing group (carboxy group) had a degree of polymerization of 200 and a degree of saponification of 97.3 mol %, and the amount of the structural unit having a carboxy group [electron-withdrawing group content] in the polyvinyl alcohol was 0.2 mol %.

Similarly, a polyvinyl acetal resin P was synthesized in the same manner as the polyvinyl acetal resin A except that a polyvinyl alcohol mixture P was used and the aldehyde (amount) shown in Table 1 was used.
(Synthesis of Polyvinyl Acetal Resin W)
A polyvinyl acetal resin W was synthesized in the same manner as the polyvinyl acetal resin A except that a polyvinyl alcohol W (degree of polymerization: 400, degree of saponification: 98.4 mol %, the amount of a structural unit having a methyl group [electron-donating group content]:0.1 mol %) was used instead of the polyvinyl alcohol A, and the aldehyde (amount) shown in Table 1 was used.
(Synthesis of Polyvinyl Acetal Resin X)
A polyvinyl acetal resin X was synthesized in the same manner as the polyvinyl acetal resin A except that a polyvinyl alcohol mixture X was used instead of the polyvinyl alcohol A and the aldehyde (amount) shown in Table 1 was used. The polyvinyl alcohol mixture X was prepared by mixing, at 1:1, a polyvinyl alcohol having a structural unit having an electron-donating group (methyl group) and a polyvinyl alcohol having a structural unit having an electron-withdrawing group (carboxy group).

The polyvinyl alcohol having a structural unit having an electron-donating group (methyl group) had a degree of polymerization of 600 and a degree of saponification of 98.3 mol %, and the amount of the structural unit having a methyl group [electron-donating group content] in the polyvinyl alcohol was 0.2 mol %.

The polyvinyl alcohol having a structural unit having an electron-withdrawing group (carboxy group) had a degree of polymerization of 200 and a degree of saponification of 98.2 mol %, and the amount of the structural unit having a carboxy group [electron-withdrawing group content] in the polyvinyl alcohol was 0.2 mol %.

Example 1

(Preparation of Composition for Secondary Battery Electrode)

To 20 parts by weight of a resin solution containing the obtained polyvinyl acetal resin A (polyvinyl acetal resin: 2.5 parts by weight) were added 50 parts by weight of lithium cobaltate (CELLSEED C-5H available from Nippon Chemical Industrial Co., Ltd.) as an active material, 5 parts by weight of acetylene black (DENKA BLACK available from Denki Kagaku Kogyo Kabushiki Kaisha) as a conductive aid, and 26 parts by weight of N-methylpyrrolidone, and they were mixed using a THINKY MIXER available from Thinky Corporation to prepare a composition for a secondary battery electrode.

Examples 2 to 18 and Comparative Examples 1 to 3 and 5 to 12

Compositions for a secondary battery electrode were obtained in the same manner as in Example 1 except that the polyvinyl acetal resins (resin types, amounts) as shown in Table 2 were used.

Comparative Example 4

A composition for a secondary battery electrode was obtained as in Example 1 except that a mixture of the polyvinyl acetal resins T1 and T2 shown in Table 1 was used.

TABLE 1

| Resin type | Degree of polymerization | Mixing ratio | Degree of saponification (mol %) | Electron-donating group (A) | | | Electron-withdrawing group (B) | | | Aldehyde Amount (parts by weight) |
|---|---|---|---|---|---|---|---|---|---|---|
| | | | | Functional group type | pKa | Amount (mol %) | Functional group type | pKa | Amount (mol %) | |
| A | 250 | | 98.3 | a | 0.3 | 0.01 | p | 4.8 | 10 | 53.1 |
| B | 250 | | 98.3 | a | 0.3 | 0.1 | p | 4.8 | 0.1 | 62.7 |
| C | 250 | | 98.3 | a | 0.3 | 10 | p | 4.8 | 0.01 | 53.5 |
| D | 250 | | 98.3 | a | 0.3 | 0.1 | p | 4.8 | 0.1 | 48.3 |
| E | 250 | | 98.4 | a | 0.3 | 0.1 | p | 4.8 | 0.1 | 27.1 |
| F | 400 | | 98.5 | a | 0.3 | 0.1 | p | 4.8 | 0.1 | 62.4 |
| G | 400 | | 98.4 | a | 0.3 | 0.01 | p | 4.8 | 10 | 37.2 |
| H | 400 | | 98.3 | a | 0.3 | 0.1 | p | 4.8 | 0.1 | 49.2 |
| I | 400 | | 98.3 | a | 0.3 | 10 | p | 4.8 | 0.01 | 38.1 |
| J1 | 400 | | 98.3 | b | 9.2 | 0.1 | q | 1.9 | 0.1 | 47.5 |
| J2 | 400 | | 98.1 | c | 0.4 | 0.1 | p | 4.8 | 0.1 | 63.1 |
| J3 | 800 | | 98.4 | a | 0.3 | 0.1 | d | 4.8 | 0.1 | 49.1 |
| K | 600 | 1:1 | 97.8 | a | 0.3 | 0.2 | — | — | — | 27.4 |
| | 200 | | 97.3 | — | — | — | p | 4.8 | 0.2 | |
| L | 800 | | 98.4 | a | 0.3 | 0.1 | p | 4.8 | 0.1 | 63.5 |
| M | 800 | | 98.2 | a | 0.3 | 0.1 | p | 4.8 | 0.1 | 48.8 |
| N | 800 | | 98.5 | a | 0.3 | 0.01 | p | 4.8 | 10 | 18.0 |
| O | 800 | | 98.3 | a | 0.3 | 0.1 | p | 4.8 | 0.1 | 28.2 |
| P | 400 | 1:1 | 98.3 | a | 0.3 | 0.2 | — | — | — | 48.4 |
| | 400 | | 98.2 | — | — | — | p | 4.8 | 0.2 | |
| Q | 200 | | 97.3 | a | 0.3 | 0.1 | p | 4.8 | 0.1 | 47.0 |
| R | 250 | | 98.2 | a | 0.3 | 0.1 | — | — | — | 47.5 |
| S | 250 | | 98.3 | — | — | — | p | 4.8 | 0.1 | 48.0 |
| T1 | 250 | | 98.5 | a | 0.3 | 0.2 | — | — | — | 47.9 |
| T2 | 250 | | 98.4 | — | — | — | p | 4.8 | 0.2 | 47.7 |
| U | 250 | | 98.1 | — | — | — | — | — | — | 48.2 |
| V | 400 | | 98.2 | a | 0.3 | 0.1 | p | 4.8 | 0.1 | 68.1 |
| W | 400 | | 98.4 | e | 49 | 0.1 | — | — | — | 48.7 |
| X | 600 | 1:1 | 98.3 | e | 49 | 0.2 | — | — | — | 47.2 |
| | 200 | | 98.2 | — | — | — | p | 4.8 | 0.2 | |
| Y1 | 900 | | 98.1 | a | 0.3 | 0.1 | p | 4.8 | 0.1 | 48.0 |
| Y2 | 400 | | 98.1 | a | 0.3 | 0.1 | p | 4.8 | 0.1 | 22.6 |
| Y3 | 400 | | 97.6 | a | 0.3 | 0.1 | p | 4.8 | 0.1 | 13.5 |
| Y4 | 1500 | | 97.3 | a | 0.3 | 0.1 | p | 4.8 | 0.1 | 51.2 |

TABLE 1-continued

| | | Polyvinyl acetal | | | | | | | |
|---|---|---|---|---|---|---|---|---|---|
| | | Hydroxy group | Degree of | Acetyl group | Electron-donating group (A) | | Electron-withdrawing group (B) | | A/B |
| Resin type | Degree of polymerization | content (mol %) | acetalization (mol %) | content (mol %) | pKa | Amount (mol %) | pKa | Amount (mol %) | content ratio |
| A | 250 | 35.2 | 53.1 | 1.7 | 0.3 | 0.01 | 4.8 | 10 | 0.001 |
| B | 250 | 35.4 | 62.7 | 1.7 | 0.3 | 0.1 | 4.8 | 0.1 | 1 |
| C | 250 | 34.8 | 53.5 | 1.7 | 0.3 | 10 | 4.8 | 0.01 | 1000 |
| D | 250 | 49.8 | 48.3 | 1.7 | 0.3 | 0.1 | 4.8 | 0.1 | 1 |
| E | 250 | 71.1 | 27.1 | 1.6 | 0.3 | 0.1 | 4.8 | 0.1 | 1 |
| F | 400 | 35.9 | 62.4 | 1.5 | 0.3 | 0.1 | 4.8 | 0.1 | 1 |
| G | 400 | 51.2 | 37.2 | 1.6 | 0.3 | 0.01 | 4.8 | 10 | 0.001 |
| H | 400 | 48.9 | 49.2 | 1.7 | 0.3 | 0.1 | 4.8 | 0.1 | 1 |
| I | 400 | 50.20 | 38.1 | 1.7 | 0.3 | 10.00 | 4.8 | 0.01 | 1000 |
| J1 | 400 | 50.6 | 47.5 | 1.7 | 9.2 | 0.1 | 1.9 | 0.1 | 1 |
| J2 | 400 | 34.8 | 63.1 | 1.9 | 0.3 | 0.1 | 4.8 | 0.1 | 1 |
| J3 | 800 | 49.1 | 49.1 | 1.6 | 0.3 | 0.1 | 4.8 | 0.1 | 1 |
| K | 400 | 69.8 | 27.4 | 2.5 | 0.3 | 0.1 | 4.8 | 0.1 | 1 |
| L | 800 | 34.7 | 63.5 | 1.6 | 0.3 | 0.1 | 4.8 | 0.1 | 1 |
| M | 800 | 49.2 | 48.8 | 1.8 | 0.3 | 0.1 | 4.8 | 0.1 | 1 |
| N | 800 | 70.5 | 18.0 | 1.5 | 0.3 | 0.01 | 4.8 | 10 | 0.001 |
| O | 800 | 69.9 | 28.2 | 1.7 | 0.3 | 0.1 | 4.8 | 0.1 | 1 |
| P | 800 | 49.5 | 48.4 | 1.8 | 0.3 | 0.1 | 4.8 | 0.1 | 1 |
| Q | 200 | 50.1 | 47.0 | 2.7 | 0.3 | 0.1 | 4.8 | 0.1 | 1 |
| R | 250 | 50.6 | 47.5 | 1.8 | 0.3 | 0.1 | — | — | — |
| S | 250 | 50.2 | 48.0 | 1.7 | — | — | 4.8 | 0.1 | — |
| T1 | 250 | 50.4 | 47.9 | 1.5 | 0.3 | 0.2 | — | — | — |
| T2 | 250 | 50.5 | 47.7 | 1.6 | — | — | 4.8 | 0.2 | — |
| U | 250 | 49.9 | 48.2 | 1.9 | — | — | — | — | — |
| V | 400 | 29.9 | 68.1 | 1.8 | 0.3 | 0.1 | 4.8 | 0.1 | 1 |
| W | 400 | 49.6 | 48.7 | 1.6 | 49.0 | 0.1 | — | — | — |
| X | 400 | 50.7 | 47.2 | 1.8 | 49.0 | 0.1 | 4.8 | 0.1 | 1 |
| Y1 | 900 | 49.9 | 48.0 | 1.9 | 0.3 | 0.1 | 4.8 | 0.1 | 1 |
| Y2 | 400 | 75.3 | 22.6 | 1.9 | 0.3 | 0.1 | 4.8 | 0.1 | 1 |
| Y3 | 400 | 83.9 | 13.5 | 2.4 | 0.3 | 0.1 | 4.8 | 0.1 | 1 |
| Y4 | 1500 | 45.9 | 51.2 | 2.7 | 0.3 | 0.1 | 4.8 | 0.1 | 1 |

In the "Functional group type" column in Table 1, "a" represents a functional group having a lactam structure (aziridine group), "b" represents an amino group, "c" represents a functional group having a lactam structure (pyrrolidone group), "d" represents an amide group, "e" represents a methyl group, "p" represents a carboxy group, and "q" represents a sulfo group. All of the b, d, e, p, and q have a structure in which the functional group is directly bonded to carbon constituting the main chain.

<Evaluation>

The compositions for a secondary battery electrode obtained in the examples and the comparative examples were evaluated as follows. Table 2 shows the results. In the examples and comparative examples, the rating "○ (Good)" was given when the white powder of polyvinyl acetal resin was appropriately obtained, and the rating "x (Poor)" was given when the white powder of the polyvinyl acetal resin was not appropriately obtained due to, for example, particles sticking together (resin powderization evaluation).

(1) Adhesiveness (Peeling Force)

Evaluation of the adhesion to aluminum foil was performed on the compositions for a secondary battery electrode obtained in the examples and comparative examples.

Each of the compositions for an electrode was applied to aluminum foil (thickness: 20 μm) to the thickness after drying of 20 μm, and dried to prepare a test sample in which a sheet-like electrode was formed on aluminum foil.

A piece in a size of 1 cm in length and 2 cm in width was cut out from the sample. The sample piece was immobilized using an AUTOGRAPH ("AGS-J" available from Shimadzu Corporation) and the electrode sheet was pulled up for measurement of the peeling force (N) needed for completely peeling the electrode sheet from the aluminum foil. The adhesiveness of each composition was evaluated based on the following criteria.

○ (Good): Peeling force of higher than 8.0 N
Δ (Average): Peeling force of 5.0 to 8.0 N
x (Poor): Peeling force of lower than 5.0 N (2) Dispersibility (Surface Roughness)

Using the test sample in "(1) Adhesiveness", the surface roughness Ra was measured in conformity with JIS B 0601 (1994). The surface roughness of the electrode was evaluated based on the following criteria. Commonly, when the dispersibility of the active material is higher, the surface roughness is said to be smaller.

○ (Good): Ra of less than 3 μm
Δ (Average): Ra of 3 μm or more but less than 4 μm
x (Poor): Ra of 4 μm or more (3) Resistance against electrolyte solution (solvent solubility)

(Production of Electrode Sheet)

Onto a polyethylene terephthalate (PET) film preliminarily subjected to release treatment was applied each of the compositions for a secondary battery electrode obtained in the examples and comparative examples to the thickness after drying of 20 μm, and dried to give an electrode sheet.

A 2-cm-square piece was cut out from the electrode sheet to prepare an electrode sheet sample.

(Evaluation of Dissolution Rate)

The obtained sample was accurately weighed, and the weight of the resin contained in the sample was calculated based on the weight ratio of the components contained in the sheet. Then, the sample was placed in a mesh bag, and the total weight of the mesh bag and the sample was accurately measured.

The mesh bag containing the sample was immersed in a solvent mixture (diethyl carbonate:ethylene carbonate=1:1) which is a solvent of an electrolyte solution, and left to stand at 60° C. for five hours. After the standing, the mesh bag was taken out and dried under the conditions of 150° C. and eight hours, thereby completely vaporizing the solvent.

The mesh bag was taken out from the dryer, left to stand at room temperature for one hour, and weighed. The amount of the resin dissolved in the solvent mixture was calculated based on the weight change before and after the test, and the dissolution rate of the resin was calculated based on the ratio between the amount of the resin dissolved and the preliminarily calculated weight of the resin. The obtained dissolution rate was evaluated based on the following criteria.
∘ (Good): Dissolution rate of lower than 1%
Δ (Average): Dissolution rate of 1% or higher but lower than 2%
x (Poor): Dissolution rate of 2% or higher (4) Moisture Absorption The sample obtained in the "(3) Resistance against electrolyte solution" was accurately weighed.

The sample was then left to stand at a relative humidity of 95% and 30° C. for 24 hours. The sample was taken out and then accurately weighed. The moisture content was calculated from the weight change before and after the test, and evaluated according to the following criteria.
∘ (Good): Moisture content of less than 5%.
Δ (Average): Moisture content of 5% or more but less than 7%.
x (Poor): Moisture content of 7% or more (5) Electrode Resistance Measurement The electrode resistance of the electrode sheet obtained in the "(1) Adhesiveness" was measured with an electrode resistance meter (available from Hioki E.E. Corp.), and evaluated according to the following criteria.
∘ (Good): Electrode resistance of less than 1,000 Ω/sq
x (Poor): Electrode resistance of 1,000 Ω/sq or more

TABLE 2

| | Composition for secondary battery electrode | | | | Evaluation | | | |
|---|---|---|---|---|---|---|---|---|
| | | Binder | | Amount relative to 100 parts by weight of active material (parts by weight) | | Adhesiveness | | Dispersibility Surface |
| | Active material (parts by weight) | Resin type | Amount (parts by weight) | | Resin powerization | Peeling force (N) | Rating | roughness Ra (μm) |
| Example 1 | 50 | A | 2.5 | 5 | ∘ | 6.6 | Δ | 2.0 |
| Example 2 | 50 | B | 0.005 | 0.01 | ∘ | 6.6 | Δ | 1.9 |
| Example 3 | 50 | C | 10 | 20 | ∘ | 6.6 | Δ | 1.8 |
| Example 4 | 50 | D | 2.5 | 5 | ∘ | 7.8 | Δ | 2.3 |
| Example 5 | 50 | E | 2.5 | 5 | ∘ | 9.0 | ∘ | 2.7 |
| Example 6 | 50 | F | 2.5 | 5 | ∘ | 10.8 | ∘ | 1.5 |
| Example 7 | 50 | G | 2.5 | 5 | ∘ | 12.0 | ∘ | 2.0 |
| Example 8 | 50 | H | 2.5 | 5 | ∘ | 12.6 | ∘ | 1.9 |
| Example 9 | 50 | I | 2.5 | 5 | ∘ | 12.0 | ∘ | 1.8 |
| Example 10 | 50 | J1 | 2.5 | 5 | ∘ | 10.8 | ∘ | 1.5 |
| Example 11 | 50 | J2 | 2.5 | 5 | ∘ | 12.3 | ∘ | 1.9 |
| Example 12 | 50 | J3 | 2.5 | 5 | ∘ | 16.7 | ∘ | 1.2 |
| Example 13 | 50 | K | 2.5 | 5 | ∘ | 13.2 | ∘ | 2.3 |
| Example 14 | 50 | L | 2.5 | 5 | ∘ | 15.0 | ∘ | 1.1 |
| Example 15 | 50 | M | 2.5 | 5 | ∘ | 16.2 | ∘ | 1.5 |
| Example 16 | 50 | N | 2.5 | 5 | ∘ | 17.4 | ∘ | 2.0 |
| Example 17 | 50 | O | 2.5 | 5 | ∘ | 17.4 | ∘ | 1.9 |
| Example 18 | 50 | P | 2.5 | 5 | ∘ | 12.5 | ∘ | 1.8 |
| Comparative Example 1 | 50 | Q | 2.5 | 5 | ∘ | 4.8 | X | 2.5 |
| Comparative Example 2 | 50 | R | 2.5 | 5 | ∘ | 10.2 | ∘ | 1.3 |
| Comparative Example 3 | 50 | S | 2.5 | 5 | ∘ | 11.4 | ∘ | 1.6 |
| Comparative Example 4 | 50 | T1 + T2 | 2.5 | 5 | ∘ | 11.4 | ∘ | 1.8 |
| Comparative Example 5 | 50 | U | 2.5 | 5 | ∘ | 12 | ∘ | 1.9 |
| Comparative Example 6 | 50 | V | 2.5 | 5 | ∘ | 10.8 | ∘ | 1.5 |
| Comparative Example 7 | 50 | W | 2.5 | 5 | ∘ | 11.2 | ∘ | 1.8 |
| Comparative Example 8 | 50 | X | 2.5 | 5 | ∘ | 10.8 | ∘ | 2.1 |
| Comparative Example 9 | 50 | Y1 | 2.5 | 5 | ∘ | 18.3 | ∘ | 1.3 |
| Comparative Example 10 | 50 | Y2 | 2.5 | 5 | X | 13.8 | ∘ | 2.5 |

TABLE 2-continued

| | | | | | | | | |
|---|---|---|---|---|---|---|---|---|
| Comparative Example 11 | 50 | Y3 | 2.5 | 5 | X | 10.1 | ○ | 2.1 |
| Comparative Example 12 | 50 | Y4 | 2.5 | 5 | ○ | 20.1 | ○ | 4.1 |

| | Evaluation | | | | | |
|---|---|---|---|---|---|---|
| | Resistance against electrolyte solution | | Moisture absorption | | Electrode resistance | |
| | Dispersibility Rating | Dissolution rate (%) | Rating | Moisture content (%) | Rating | Resistance (Ω/sq) | Rating |
| Example 1 | ○ | 0.8 | ○ | 4.7 | ○ | 761 | ○ |
| Example 2 | ○ | 0.7 | ○ | 4.2 | ○ | 483 | ○ |
| Example 3 | ○ | 0.6 | ○ | 4.7 | ○ | 866 | ○ |
| Example 4 | ○ | 0.9 | ○ | 4.0 | ○ | 448 | ○ |
| Example 5 | ○ | 1.1 | Δ | 2.8 | ○ | 419 | ○ |
| Example 6 | ○ | 0.6 | ○ | 5.2 | Δ | 502 | ○ |
| Example 7 | ○ | 0.9 | ○ | 4.5 | ○ | 717 | ○ |
| Example 8 | ○ | 0.8 | ○ | 4.0 | ○ | 465 | ○ |
| Example 9 | ○ | 0.7 | ○ | 3.5 | ○ | 810 | ○ |
| Example 10 | ○ | 0.5 | ○ | 2.6 | ○ | 465 | ○ |
| Example 11 | ○ | 1.2 | Δ | 5.1 | Δ | 624 | ○ |
| Example 12 | ○ | 0.8 | ○ | 4.3 | ○ | 446 | ○ |
| Example 13 | ○ | 1.0 | Δ | 2.8 | ○ | 433 | ○ |
| Example 14 | ○ | 0.5 | ○ | 5.2 | Δ | 523 | ○ |
| Example 15 | ○ | 0.7 | ○ | 4.0 | ○ | 483 | ○ |
| Example 16 | ○ | 1.0 | Δ | 3.3 | ○ | 679 | ○ |
| Example 17 | ○ | 0.9 | ○ | 2.8 | ○ | 448 | ○ |
| Example 18 | ○ | 0.9 | ○ | 4.2 | ○ | 512 | ○ |
| Comparative Example 1 | ○ | 0.9 | ○ | 4.0 | ○ | 492 | ○ |
| Comparative Example 2 | ○ | 0.5 | ○ | 2.4 | ○ | 1026 | X |
| Comparative Example 3 | ○ | 0.6 | ○ | 3.8 | ○ | 1054 | X |
| Comparative Example 4 | ○ | 0.8 | ○ | 4.3 | ○ | 1196 | X |
| Comparative Example 5 | ○ | 0.8 | ○ | 3 | ○ | 1652 | X |
| Comparative Example 6 | ○ | 2.5 | X | 2.6 | ○ | 465 | ○ |
| Comparative Example 7 | ○ | 2.4 | X | 2.1 | ○ | 1543 | X |
| Comparative Example 8 | ○ | 2.2 | X | 4.6 | ○ | 1351 | X |
| Comparative Example 9 | ○ | 2.1 | X | 4 | ○ | 441 | ○ |
| Comparative Example 10 | ○ | 1.1 | Δ | 5.4 | Δ | 419 | ○ |
| Comparative Example 11 | ○ | 0.4 | ○ | 7.1 | X | 548 | ○ |
| Comparative Example 12 | X | 1.2 | Δ | 3.5 | ○ | 1240 | X |

INDUSTRIAL APPLICABILITY

The present invention can provide a composition for a secondary battery electrode which is excellent in dispersibility of an active material and adhesiveness, capable of preventing battery deterioration and failure due to moisture absorption, and capable of providing a high-capacity secondary battery.

The invention claimed is:

1. A composition for a secondary battery electrode, comprising:
    an active material;
    a binder; and
    an organic solvent,
    the binder containing a polyvinyl acetal resin,
    the polyvinyl acetal resin having an electron-donating group that has an acid dissociation constant in water of less than 16 and an electron-withdrawing group,
    the polyvinyl acetal resin having a degree of polymerization of 250 to 800 and a hydroxy group content of 35 to 70 mol %, and
    the electron-withdrawing group being bonded directly to a carbon constituting a main chain, or being bonded to an acetal group of the polyvinyl acetal resin.

2. The composition for a secondary battery electrode according to claim 1,
    wherein the electron-donating group is a functional group having a lactam structure.

3. The composition for a secondary battery electrode according to claim 2,
    wherein the lactam structure is at least one cyclic structure selected from the group consisting of a 3-membered ring, a 4-membered ring, a 5-membered ring, and a 6-membered ring.

4. The composition for a secondary battery electrode according to claim 2, wherein the lactam structure is a structure represented by the following formula (1):

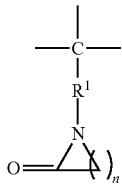

(1)

wherein n is an integer of 1 to 5 and $R^0$ is a single bond or a C1-C10 saturated or unsaturated hydrocarbon.

5. The composition for a secondary battery electrode according to claim 3,
wherein a hydrocarbon constituting the cyclic structure of the lactam structure is unsubstituted, or a hydrogen atom of the hydrocarbon is substituted with a C1-C10 saturated or unsaturated hydrocarbon.

6. The composition for a secondary battery electrode according to claim 1,
wherein in the polyvinyl acetal resin, the amount of a structural unit having the electron-donating group is 0.01 to 10 mol %.

7. The composition for a secondary battery electrode according to claim 1,
wherein the electron-withdrawing group is a carboxy group.

8. The composition for a secondary battery electrode according to claim 1,
wherein in the polyvinyl acetal resin, the amount of a structural unit having the electron-withdrawing group is 0.01 to 10 mol %.

9. The composition for a secondary battery electrode according to claim 1,
wherein the polyvinyl acetal resin has a degree of acetalization of 20 to 70 mol %.

10. The composition for a secondary battery electrode according to claim 1,
wherein the polyvinyl acetal resin has a structural unit having the acetyl group and the acetyl group content is 15 mol % or less.

11. The composition for a secondary battery electrode according to claim 1, containing 0.01 to 20 parts by weight of the polyvinyl acetal resin relative to 100 parts by weight of the active material.

12. The composition for a secondary battery electrode according to claim 1, further comprising a polyvinylidene fluoride resin.

13. A secondary battery comprising
the composition for a secondary battery electrode according to claim 1.

14. The composition for a secondary battery electrode according to claim 1,
wherein the electron-donating group is at least one functional group selected from the group consisting of an amino group, an alkylamino group, —S—, and a functional group having a lactam structure.

15. The composition for a secondary battery electrode according to claim 1,
wherein the electron-withdrawing group is at least one functional group selected from the group consisting of an acidic group, a nitro group, a sulfo group, a sulfonyl group, a sulfinyl group, a formyl group, a fluorinated alkyl group and a halogen.

* * * * *